Patented May 12, 1936

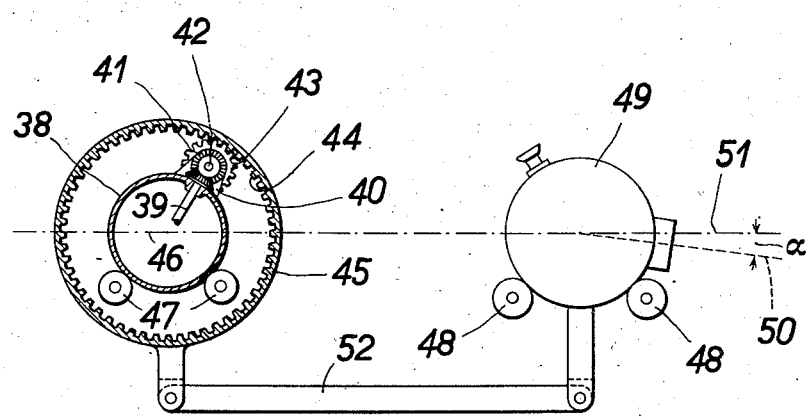

2,040,171

UNITED STATES PATENT OFFICE 2,040,171

SIGHT LINE HORIZON DETERMINING MEANS

Otto Eppenstein, Jena, Germany, assignor to the firm of Carl Zeiss, Jena, Germany Application May 15, 1934, Serial No. 725,752
In Germany May 16, 1933

1 Claim. (Cl. 33—73)

I have filed an application in Germany, May 16, 1933 of which the following is a specification.

In shooting with guns mounted on an oscillating base, for instance on board ship, on aircraft or the like, it is necessary to continuously determine the horizontal line through the gun. This determination is not very easy because the indications of the auxiliary means to be used for this purpose are unfavourably influenced by the oscillations and the movement of the base. In most cases, a plummet and a level may not be used on account of the errors due to acceleration, and the horizon is frequently not visible at all or, because of refraction, may not be seen in its correct position. The use of gyroscopes requires comparatively unwieldy mechanisms, which, in their usual constructions, are caused by the ship's movements to produce erroneous results that may be rectified by viewing the horizon only when the conditions of visibility are favourable.

The inventive idea consists in a method of determining a horizontal line through a point on board ship and at a known height above sea level, this method overcoming the said difficulties and avoiding the sources of error. In this new method, the sought horizontal line is determined by maintaining the elevation of a stereoscopic rangefinder on board ship continuously so adjusted as to keep this rangefinder permanently directed to a point in the sea-level and at a constant distance from the rangefinder, namely to the aiming point, the sought horizontal line being deduced from the consequent angle of elevation of the aiming point, at which angle the line connecting the rangefinder and this aiming point, namely the sighting line, is inclined relatively to the said horizontal line. This method is especially simple because it requires only insignificant alterations of instruments generally used on board ship and special instruments for the said purpose may be dispensed with.

An instrument for carrying the new method into practice consists of a stereoscopic rangefinder which contains a stereoscopic mark at a constant apparent distance and a device for indicating the variations of that angle which is included between the sighting line and a line parallel to the ship's deck and at right angles to the base of the rangefinder. By means of a rangefinder of this kind, it is possible also under unfavourable conditions of observation to determine the horizontal line, since no special auxiliary aim in the sea-level is required and the apparent distance of the mark may be so small that that point in the sea-level which lies at the distance of this mark may be correctly perceived in the rangefinder and because this rangefinder may be given such an elevation that the said point in the sea-level seems to coincide with the mark. The said variations of angle, which are indicated by the device in the rangefinder, correspond to the oscillations of the ship and are equal to the variations of the angle of elevation of the rangefinder which are due to the said oscillations of the ship. These variations of angle can be read continuously and transmitted to other instruments on board ship. With a view to simplifying this transmission, the instrument may be provided with a device for transmitting the variations of the elevation of the rangefinder to another apparatus mounted on board ship. When there is to be stabilized for instance the horizontal position of a straight line of an instrument mounted on board ship in such a manner as to be rotatable about an axis approximately parallel to the ship's deck and at right angles to the said straight line, the instrument containing the straight line is conveniently so coupled to a stereoscopic rangefinder rotatable about an axis parallel to its base and having a stereoscopic mark at a constant apparent distance that both the said apparatus and the rangefinder may be rotated conjointly through identical angles of elevation.

The accompanying drawing which represents a constructional example of the invention shows the example in part-sectional elevation.

The example is based on the problem how to use the new apparatus for obtaining correct height indications by means of a rangefinder 38 constructed as an altimeter. The known gear by means of which a range indication is transformed to a height indication is represented by a bevel wheel 40 attached to a shaft 39 and in mesh with a bevel wheel 41. On the axle 42 of the bevel wheel 41, which is rotatably mounted on the altimeter 38, is rotatably provided a toothed wheel 43 in mesh with the internal teeth 44 of a ring 45 which is assumed to be mounted for rotation about an axle on board ship. As is well known, the wheel gear of the altimeter 38 supplies correct height indications when the ring 45 is independent of the ship's oscillations, that is to say when a definite diameter of the ring 45, for instance the horizontal diameter 46, is made to be continuously horizontal. This problem is solved by the new apparatus. By means of rollers 47, the altimeter 38 may be rotated about its base, which coincides with the axis of the ring 45. In parallel to the altimeter 38 is a stereoscopic rangefinder 49, which is supported by rollers 48 in quite the same manner and provided with a stereoscopic mark at a constant apparent distance $e$. The line of sight 50 of the rangefinder 49 is inclined at the angle of elevation $\alpha$ relatively to the horizontal line 51. The rangefinder 49 is so coupled to the ring 45 by means of a connecting parallelogram link 52 that both the rangefinder and the ring may be rotated on board ship through equal angles.

When using the apparatus according to the example, the rangefinder is so directed that a point at the distance $e$ on the sea-level is continuously aimed at, which is effected for instance in such a manner that, during the observation, the connecting parallelogram link 52 is continuously adjusted by hand according to the oscillations of the ship and that the rangefinder 49 is thus rotated about its base relatively to the deck of the ship. The horizontal line 51 remains permanently horizontal, and the line of sight 50 is inclined at the angle $\alpha$ relatively to this horizontal line. As the ring 45 is to effect the corresponding rotations about its axle, also its diameter 46 remains horizontal, as a consequence of which the ring 45 is stabilized. Variations of the elevation of the rangefinder, which may be due for instance to different loads of the ship, may be compensated for by making the rangefinder 49 rotatable about a corresponding angle of correction relatively to the connecting parallelogram.

I claim:

Apparatus for stabilizing the horizontal position of a straight line of a body, this body being rotatable about an axis on board ship, this axis being approximately parallel to the ship's deck and at right angles to the said line to be stabilized, the said apparatus consisting of a stereoscopic rangefinder containing a stereoscopic mark of a constant apparent distance, the rangefinder being rotatable about an axis on board ship, the last said axis being parallel to the base of the said rangefinder and to the axis of rotation of said body, and a device for so coupling the said body to the said rangefinder that a rotation of the rangefinder about its axis effects a corresponding equal rotation of the body about its axis.

OTTO EPPENSTEIN.